United States Patent
Nagle

(10) Patent No.: US 9,920,629 B2
(45) Date of Patent: Mar. 20, 2018

(54) PROPELLER BLADE AND METHOD

(71) Applicant: Hamilton Sundstrand Corporation, Windsor Locks, CT (US)

(72) Inventor: David P. Nagle, Westfield, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 904 days.

(21) Appl. No.: 14/185,368

(22) Filed: Feb. 20, 2014

(65) Prior Publication Data

US 2015/0233249 A1 Aug. 20, 2015

(51) Int. Cl.
*B64C 11/26* (2006.01)
*F01D 5/14* (2006.01)
(Continued)

(52) U.S. Cl.
CPC ........... *F01D 5/14* (2013.01); *B29D 99/0025* (2013.01); *B64C 11/26* (2013.01); *B29L 2031/087* (2013.01); *Y10T 29/49336* (2015.01)

(58) Field of Classification Search
CPC ......... B64C 11/20; B64C 11/16; B64C 11/22; B64C 11/26; B64C 27/473; B64C 2027/4733; B64C 2027/4736; F03D 1/06; B29D 99/0025; B29L 2031/08; B29L 2031/087; Y10T 29/49336; Y10T 29/49337
See application file for complete search history.

(56) References Cited

U.S. PATENT DOCUMENTS 3,112,797 A * 12/1963 Reichelt .................. B64C 11/16
244/124
4,648,921 A * 3/1987 Nutter, Jr. ............... B29C 70/08
156/242
(Continued)

FOREIGN PATENT DOCUMENTS

| EP | 2599714 A1 | 6/2013 |
| EP | 2669192 A1 | 12/2013 |
| WO | 9308017 A1 | 4/1993 |

OTHER PUBLICATIONS

F.C. Campbell. (2010). Structural Composite Materials. ASM International. Online version available at: http://app.knovel.com/hotlink/toc/id:kpSCM00001/structural-composite/structural-composite pp. 162-175.*

(Continued)

*Primary Examiner* — Jason L Vaughan
*Assistant Examiner* — Amanda Meneghini
(74) *Attorney, Agent, or Firm* — Cantor Colburn LLP

(57) ABSTRACT

A propeller blade includes an inner spar structure surrounding an inner spar foam core. Also included is a leading edge foam structure disposed proximate a leading edge of the inner spar structure. Further included is a trailing edge foam structure disposed proximate a trailing edge of the inner spar structure. Yet further included is an outer spar structure surrounding the inner spar structure, the leading edge foam structure and the trailing edge foam structure. Also included is a blade shell, a leading edge foam core located between the outer spar structure and the blade shell, and a trailing edge foam core located between the outer spar structure and the blade shell.

13 Claims, 3 Drawing Sheets

(51) Int. Cl.
   *B29D 99/00*   (2010.01)
   *B29L 31/08*   (2006.01)

(56) References Cited

U.S. PATENT DOCUMENTS

| | | | | |
|---|---|---|---|---|
| 5,042,968 A * | 8/1991 | Fecto | ............... | B29C 44/16 |
| | | | | 264/46.6 |
| 5,127,802 A * | 7/1992 | Carlson | ............... | B29C 44/18 |
| | | | | 29/889.71 |
| 9,045,986 B2 * | 6/2015 | Bianchi | ............... | B64C 11/26 |
| 9,162,750 B2 * | 10/2015 | Coupe | ............... | B64C 11/26 |
| 9,410,434 B2 * | 8/2016 | Petellaz | ............... | F01D 5/147 |
| 2013/0177422 A1 * | 7/2013 | Bianchi | ............... | B29D 99/0028 |
| | | | | 416/146 R |
| 2013/0272893 A1 * | 10/2013 | Fabre | ............... | B29C 70/24 |
| | | | | 416/226 |
| 2013/0323068 A1 * | 12/2013 | Petellaz | ............... | F01D 5/147 |
| | | | | 416/226 |

OTHER PUBLICATIONS

European Search Report regarding related EP App. No. EP 15 15 5351; dated Jun. 22, 2015; 4 pgs.

* cited by examiner

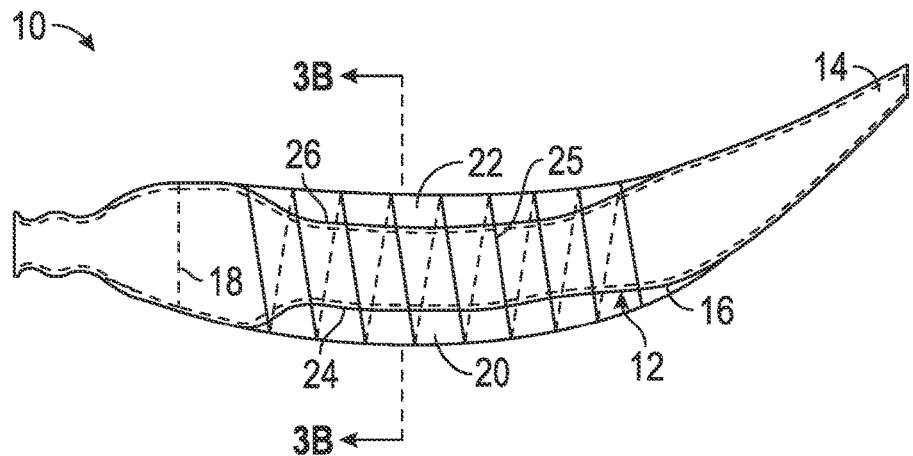
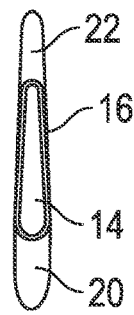
FIG. 3A
FIG. 3B
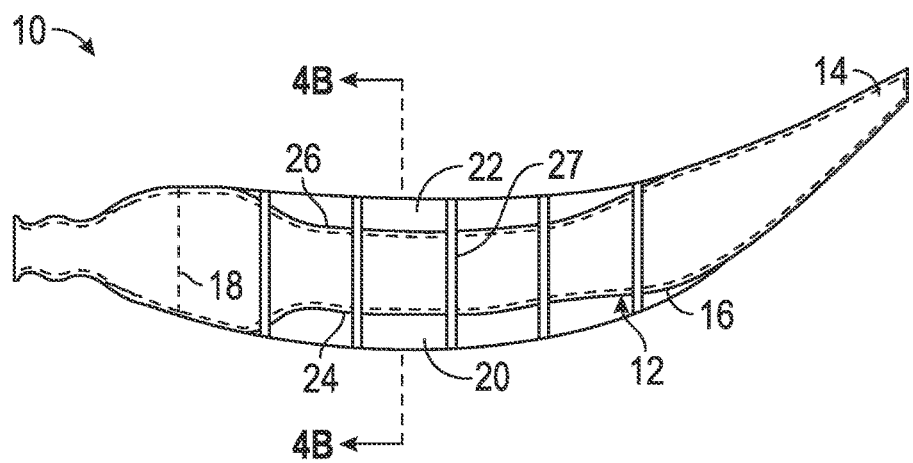
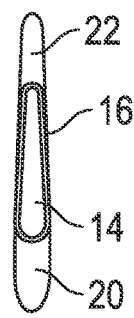
FIG. 4A
FIG. 4B

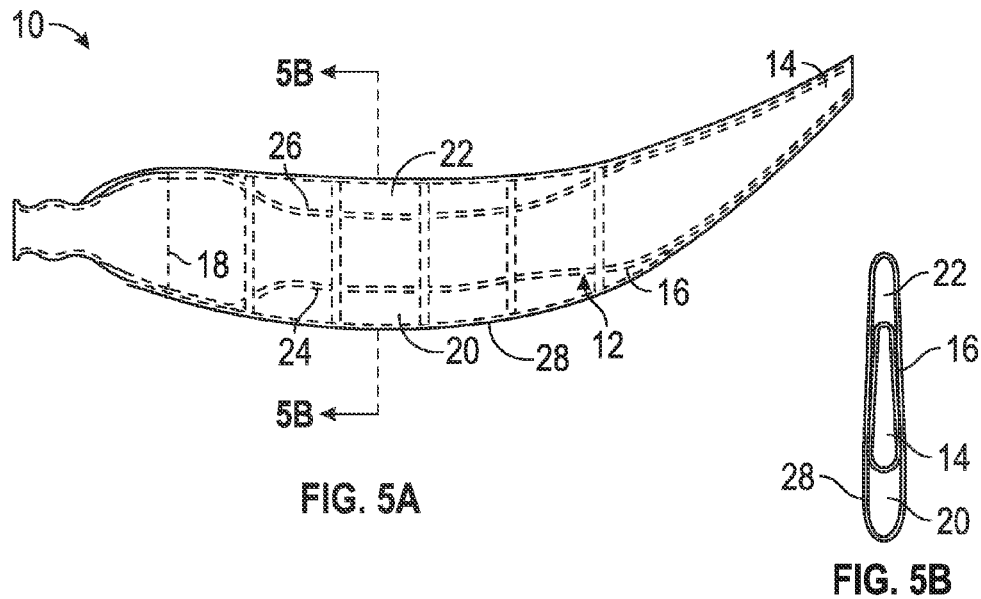
FIG. 5A
FIG. 5B
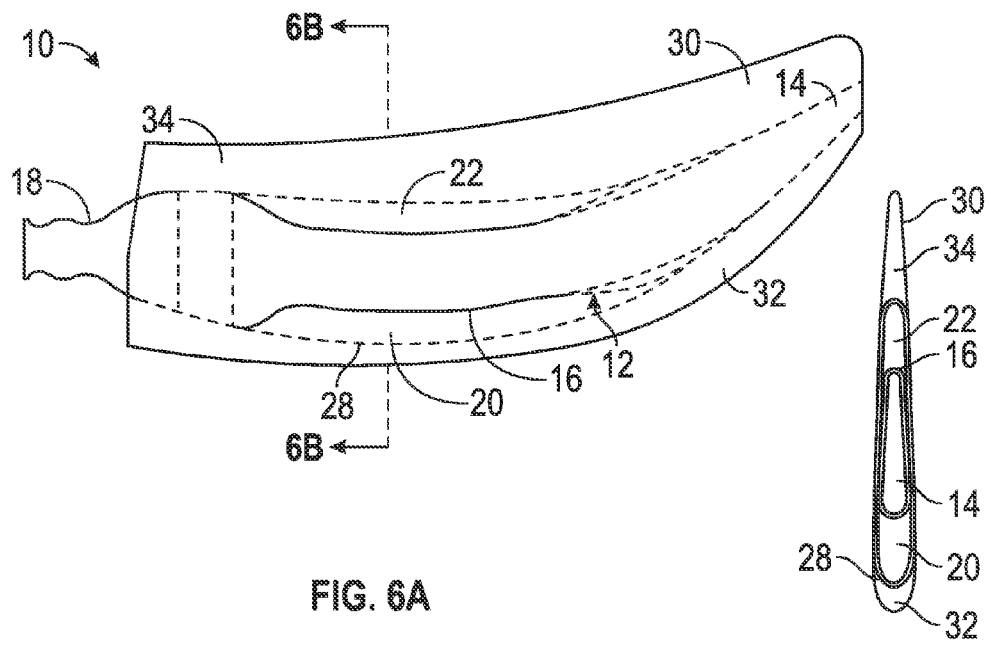
FIG. 6A
FIG. 6B

PROPELLER BLADE AND METHOD

BACKGROUND OF THE INVENTION

The embodiments herein relate to propellers and, more particularly, to propeller blades formed having an inner spar and an outer spar, as well as methods associated therewith.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric. Leading and trailing edges of the blade are then formed over the fabric and surrounded by, for example, a Kevlar sock. Such blades are light and effective for their intended purposes.

The spar foam is not typically considered to be a significant structural component. Rather, it is viewed as a component to provide a mandrel for over-braiding the carbon spar, and to provide a secondary means of providing shear transfer between the face and camber sides of the blade. The primary shear transfer is provided by the leading edge and trailing edge of the carbon spar. It has been observed for large propeller blades that considerable thermal stresses can occur in the spar foam during blade manufacturing and during its service life. These thermal stresses, combined with those due to aerodynamic and inertial loads, may result in undesirable structural consequences.

BRIEF DESCRIPTION OF THE INVENTION

According to one embodiment, a propeller blade includes an inner spar structure surrounding an inner spar foam core. Also included is a leading edge foam structure disposed proximate a leading edge of the inner spar structure. Further included is a trailing edge foam structure disposed proximate a trailing edge of the inner spar structure. Yet further included is an outer spar structure surrounding the inner spar structure, the leading edge foam structure and the trailing edge foam structure. Also included is a blade shell, a leading edge foam core located between the outer spar structure and the blade shell, and a trailing edge foam core located between the outer spar structure and the blade shell.

According to another embodiment, a method of forming a propeller blade is provided. The method includes forming an inner spar foam core and braiding an inner spar structure to the inner spar foam core. Also included is securing a leading edge foam structure to a leading edge of the inner spar structure and securing a trailing edge foam structure to a trailing edge of the inner spar structure. Further included is braiding an outer spar structure over the inner spar structure, the leading edge foam structure and the trailing edge foam structure. Yet further included is installing a leading edge foam core to the outer spar structure. Also included is installing a trailing edge foam core to the outer spar structure. Further included is encasing the outer spar structure, the leading edge foam core and the trailing edge foam core with a blade shell.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3A is a schematic illustration of the propeller blade in a third manufacturing condition according to an embodiment of the invention;

FIG. 3B is a cross-sectional view of the propeller blade taken along line 3B-3B of FIG. 3A;

FIG. 4A is a schematic illustration of the propeller blade in the third manufacturing condition according to another embodiment of the invention;

FIG. 4B is a cross-sectional view of the propeller blade taken along line 4B-4B of FIG. 4A FIG. 5A is a schematic illustration of the propeller blade in a fourth manufacturing condition;

FIG. 5B is a cross-sectional view of the propeller blade taken along line 5B-5B of FIG. 5A;

FIG. 6A is a schematic illustration of the propeller blade in a fifth manufacturing condition; and FIG. 6B is a cross-sectional view of the propeller blade taken along line 6B-6B of FIG. 6A.

DETAILED DESCRIPTION OF THE INVENTION

Referring to the Figures, schematic plan views of a propeller blade 10 are illustrated. Also shown in each figure is an associated cross-sectional view of the propeller blade 10. The figures illustrate the propeller blade 10 in various stages of formation, thereby better showing embodiments of a manufacturing process for forming the propeller blade 10, in addition to the structural embodiments of the invention.

Figures 1A, 1B:
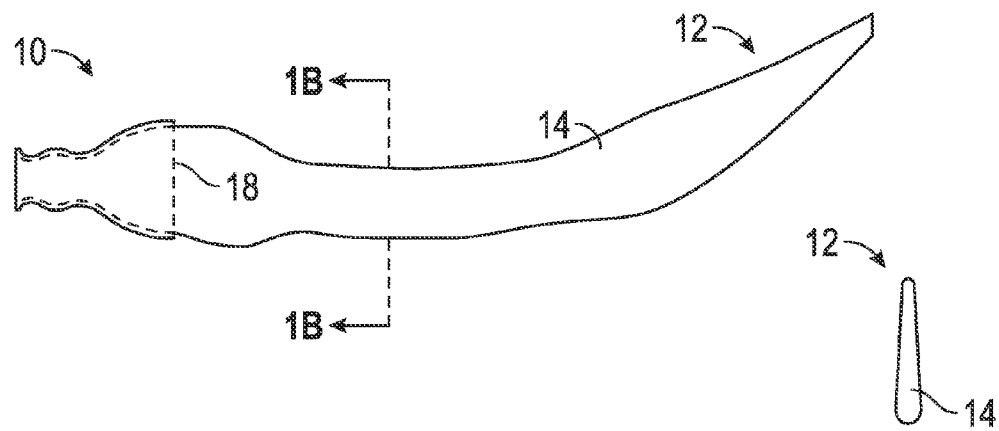
FIG. 1A is a schematic illustration of a propeller blade in a first manufacturing condition.
FIG. 1B is a cross-sectional view of the propeller blade taken along line 1B-1B of FIG. 1A.
Figures 2A, 2B:
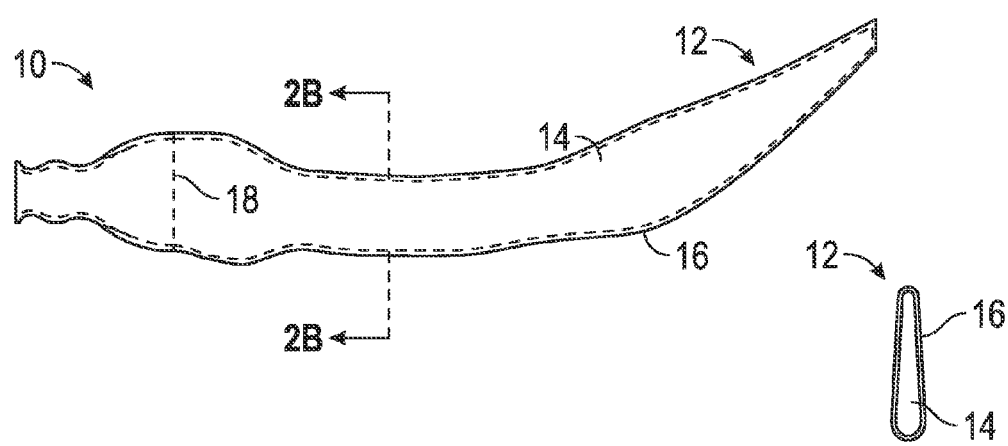
FIG. 2A is a schematic illustration of the propeller blade in a second manufacturing condition.
FIG. 2B is a cross-sectional view of the propeller blade taken along line 2B-2B of FIG. 2A.

Referring now to FIGS. 1A-2B, an inner spar 12 is illustrated. The inner spar 12 includes an inner spar foam core 14 that is surrounded by an inner spar structure 16. The inner spar foam core 14 is typically formed of a foam material that is injected into a mold. Examples of suitable foams that can be used to form the inner spar foam core 14 include polyurethane foam, polyisocyanurate foam, or polymethacrylimide. These examples of foams may be used for other foam components of the propeller blade 10 described herein. The inner spar foam core 14 may also be in the form of a pre-molded or pre-machined insert. The mold can include a layer of fiberglass or carbon on the walls thereof to which the inner spar foam core 14 adheres. As such, the inner spar foam core 14 can be surrounded by a structural member, such as fiberglass, during the injection process, but it is to be appreciated that this is not necessary in all embodiments. The inner spar structure 16 is typically formed of a dry braided material, such as carbon or fiberglass, or any other composite material, and disposed such that it surrounds the inner spar foam core 14 (and the fiberglass layer if it is included).

The inner spar structure 16 forms an inner spar braid and surrounds the inner spar foam core 14. The inner spar structure 16 is typically formed of a carbon, fiberglass or any other suitable composite material. The inner spar 12 may extend along an entire or partial length of the overall length of the propeller blade 10 in its final assembly condition. In some embodiments, the inner spar 12 extends fully, or nearly fully, along the length of the propeller blade 10 to provide the benefits associated with the additional interior structure, as will be appreciated from the description below. However, other embodiments of the inner spar 12 only extend partially along the length to reduce weight and material costs of the propeller blade 10.

A root portion 18 surrounds a portion of the inner spar 12. The root portion 18 is sometimes referred to as a "tulip" in the industry and is typically formed of a metal. The root portion 18 allows the propeller blade 10 to be connected to a hub (not shown). Rotation of the hub causes the propeller blade 10 to rotate and, consequently, causes the generation of thrust to propel the aircraft.

Referring now to FIGS. 3A-4B, a leading edge foam structure 20 and a trailing edge foam structure 22 are positioned into contact with the inner spar 12. Specifically, the leading edge foam structure 20 is placed into contact with a leading edge 24 of the inner spar structure 16 and the trailing edge foam structure 22 is placed into contact with a trailing edge 26 of the inner spar structure 16. The leading edge foam structure 20 and the trailing edge foam structure 22 are pre-molded or pre-machined foam inserts that include leading and trailing edge radii, but it is to be appreciated that a box-beam or other suitable geometric configuration may be employed in certain embodiments. Alternatively, the leading edge foam structure 20 and the trailing edge foam structure 22 may be in the form of an injectable foam. The leading edge foam structure 20 and the trailing edge foam structure 22 may be held in contact with the inner spar 12 in a number of manners. For example, securing of the foam structures 20, 22 may be facilitated by winding composite rovings 25 around the perimeter of the leading edge foam structure 20 and the trailing edge foam structure 22, as illustrated in FIGS. 3A and 3B. Alternatively, securement of the foam structures 20, 22 may be facilitated by wrapping narrow strips of resin pre-impregnated fiberglass or carbon 27 around the perimeter of the leading edge foam structure 20 and the trailing edge foam structure 22, as shown in FIGS. 4A and 4B.

Referring now to FIGS. 5A and 5B, the remainder of the overall spar assembly is illustrated. In particular, an outer spar structure 28 is shown surrounding the inner spar 12 (i.e., inner spar foam core 14 and inner spar structure 16), the leading edge foam structure 20 and the trailing edge foam structure 22. The outer spar structure 28 is braided over the aforementioned components to form the outer spar braid that completes the overall spar assembly. Specifically, the overall spar assembly provides a layered spar structure that generally includes the inner spar 12 and the outer spar structure 28.

Referring to FIGS. 6A and 6B, the remainder of the propeller blade 10 includes a blade shell 30 that encases the inner spar 12, the leading edge and trailing edge foam structures 20, 22 and the outer spar structure 28. Disposed between the outer spar structure 28 and the blade shell 30 is a leading edge foam core 32 and a trailing edge foam core 34. The airfoil leading edge and trailing edge foam cores 32, 34 may be injected into the volume between the outer spar structure 28 and the blade shell 30. Alternatively, the leading edge and trailing edge foam cores 32, 34 may be installed as pre-molded or pre-machined inserts. Upon completion of the assembly, the entire propeller blade 10 is resin injected and the inner spar 12 and the outer spar structure 28, as well as the blade shell 30 are co-cured.

It is to be appreciated that the inner spar 12 may be formed of distinct geometries. As noted above, the length of the inner spar 12 may be modified. Additionally, the inner spar 12 may have alternative contours and dimensions, with respect to the illustrated embodiment. For example, FIG. 6A illustrates in phantom an alternative design of the inner spar 12, but it is to be understood that numerous other designs may be employed.

Advantageously, segmenting or layering the overall spar structure into the inner spar 12 and the outer spar 28 results in greater flexibility of the propeller blade 10. The inner spar 12 is a more efficient torsional member than the outer spar 28 and increases the chord-wise stiffness of the face and camber sides of the outer spar 28. The outer spar 28 provides more bending stiffness than the inner spar 12. Therefore, the thickness and widths of the inner spar 12 and the outer spar 28 can be tailored to provide the most efficient and, consequently, lightest structure. Overall, the spar foam thermal stresses are reduced with inclusion of the inner spar 12 because there are three smaller volumes rather than one large volume. The inner spar 12 also provides shear and tensile load transfer between the face and camber sides of the outer spar 28.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A propeller blade comprising:
    an inner spar structure surrounding an inner spar foam core;
    a leading edge foam structure disposed proximate a leading edge of the inner spar structure;
    a trailing edge foam structure disposed proximate a trailing edge of the inner spar structure;
    an outer spar structure surrounding the inner spar structure, the leading edge foam structure and the trailing edge foam structure;
    a blade shell;
    a leading edge foam core located between the outer spar structure and the blade shell; and
    a trailing edge foam core located between the outer spar structure and the blade shell, the inner spar structure, the outer spar structure and the blade shell simultaneously co-cured upon resin injection.

2. The propeller blade of claim 1, wherein the inner spar structure comprises carbon.

3. The propeller blade of claim 1, wherein the inner spar structure comprises fiberglass.

4. The propeller blade of claim 1, further comprising an inner spar formed by the inner spar structure and the inner spar foam core, wherein the inner spar extends along an entire length of the propeller blade.

5. The propeller blade of claim 1, further comprising an inner spar formed by the inner spar structure and the inner spar foam core, wherein the inner spar extends along a partial length of the propeller blade.

6. The propeller blade of claim 1, further comprising a root disposed at least partially around the inner spar structure at an end of the propeller blade.

7. The propeller blade of claim 1, wherein the leading edge foam core and the trailing edge foam core are injectable components.

8. The propeller blade of claim 1, wherein the leading edge foam core and the trailing edge foam core are pre-molded inserts.

9. The propeller blade of claim 1, wherein the leading edge foam core and the trailing edge foam core are pre-machined inserts.

10. The propeller blade of claim 1, wherein the inner spar foam core comprises one of an injectable foam, a pre-molded insert, and a pre-machined insert.

11. A method of forming a propeller blade comprising:
forming an inner spar foam core;
braiding an inner spar structure to the inner spar foam core;
securing a leading edge foam structure to a leading edge of the inner spar structure;
securing a trailing edge foam structure to a trailing edge of the inner spar structure;
braiding an outer spar structure over the inner spar structure, the leading edge foam structure and the trailing edge foam structure;
installing a leading edge foam core to the outer spar structure;
installing a trailing edge foam core to the outer spar structure;
encasing the outer spar structure, the leading edge foam core and the trailing edge foam core with a blade shell
resin injecting the entire assembly of the propeller blade; and
curing the inner spar structure and the outer spar structure to the blade shell during resin injection of the propeller blade.

12. The method of claim 11, wherein securing the leading edge foam structure and the trailing edge foam structure to the inner spar structure comprises placing winding composite rovings around the perimeter of the leading edge and trailing edge foam structures.

13. The method of claim 11, wherein securing the leading edge foam structure and the trailing edge foam structure to the inner spar structure comprises wrapping strips of resin pre-impregnated fiberglass or carbon around the perimeter of the leading edge and trailing edge foam structures.

* * * * *